June 2, 1970  J. SIDLES  3,515,618

CHOPPER

Filed June 15, 1966

INVENTOR.
JAMES SIDLES
BY Joseph Januszkiewicz
ATTY.

United States Patent Office 3,515,618
Patented June 2, 1970

3,515,618
CHOPPER
James Sidles, Cuyahoga Falls, Ohio, assignor to The B. F. Goodrich Company, New York, N.Y., a corporation of New York
Filed June 15, 1966, Ser. No. 557,795
Int. Cl. B26d *5/20;* B29c *17/16;* B29h *17/36*
U.S. Cl. 156—405                                              3 Claims

ABSTRACT OF THE DISCLOSURE

This invention provides for the applying of small fibrous particles of rubber directly onto a rotating green tire by chopping a continuously fed material directly onto a green tire to form a contoured tread and contour stitching of such particles onto the green tire.

---

This invention relates to the fabrication of a tread and more particularly to a novel method and apparatus for fabricating a tread directly onto a green tire carcass. The term "rubber" as used is a generic term and includes artificial as well as natural rubber.

In the manufacture of pneumatic tires, various apparatus have been provided to fabricate tread rubber stock for use on green tire carcasses. One of the practices was to calender vulcanizable rubber composition for the treads, first into a sheet of substantial uniform thickness, and then into a strip of a cross section more or less trapezoid in form. This was accomplished by passing the rubber between a pair of parallel cylindrical rolls which form it into a sheet and then pass such sheet into the bight of a second pair of cooperating rolls, one of which is contoured to produce the cross section desired in the tread stock. Improvements on this included the producing of the desired cross section through successive forming stages of calendering. Another means of fabricating a tread material was to extrude a tread or assemble extruded strips of rubber in superimposed relationship; however, here as in other processes the tread material had to be cut to length, placed onto a tire carcass, and then spliced. The apparatus and method for accomplishing this required absolute precision since any excess or deficiency of material (in length) would leave the spliced portions either deficient or bulky which in turn would result in a dynamically unbalanced tire. Such particularly accentuated the unbalance in the large size tires. The calendering process is expensive and time-consuming, frequently resulting in an imperfect product with fissures or scales at the tread center and necessitating discarding and recalendering of the material. The above methods and apparatus also had to utilize means for relieving the tread material of strains and shrinkage as well as expensive tread cutting apparatus prior to their application to the green tire carcass. In such operations as discussed above, the trapping of air presented a problem.

The present invention contemplates the applying of small fibrous particles of rubber directly in a continuous stream to a rotating green tire until the tread of the tire is of the size and thickness desired. The application of the particles is such that numerous revolutions of the green tire are required before sufficient thickness is built up thereby eliminating the need to end the tire rotation at a specific location. FIG. 1 illustrates a layer of particles greatly exaggerated in thickness for purposes of illustration. Such formation of tread overcomes the difficulty of attempting to maintain exact tolerances as to length in order to control the disadvantages of the splicing operation thereby improving the quality of the finished tire. There is no air entrapment in the final tire despite the appearance of building up a thickness on the green tire carcass. The air is removed from the rubber by heat and pressure during the curing process. Further, the equipment necessary to carry out the present invention is considerably less expensive and makes feasible small runs.

The invention provides for the chopping of rubber, as by a rotating cutter, into small pieces as it emerges from an extruder or other source of supply directly onto a rotating green tire carcass, stitching such particles or pieces directly onto the green tire carcass, after which such tire is vulcanized in the conventional manner.

An object of the present invention is to provide for a novel apparatus for fabricating a tire tread directly onto a green tire carcass.

A further object of this invention is to provide a spliceless tire tread.

A further object of this invention is to fabricate a tire with a uniform tread thickness without a splice.

A further object of this invention is to provide an economical and simple method of preparing a tire tread.

Another object of this invention is to provide a new and improved method for fabricating a tire tread.

These and other objects of the invention will be apparent from the following description of the presently preferred embodiment described with reference to the accompanying drawings forming a part of the application in which.

Figure 1:
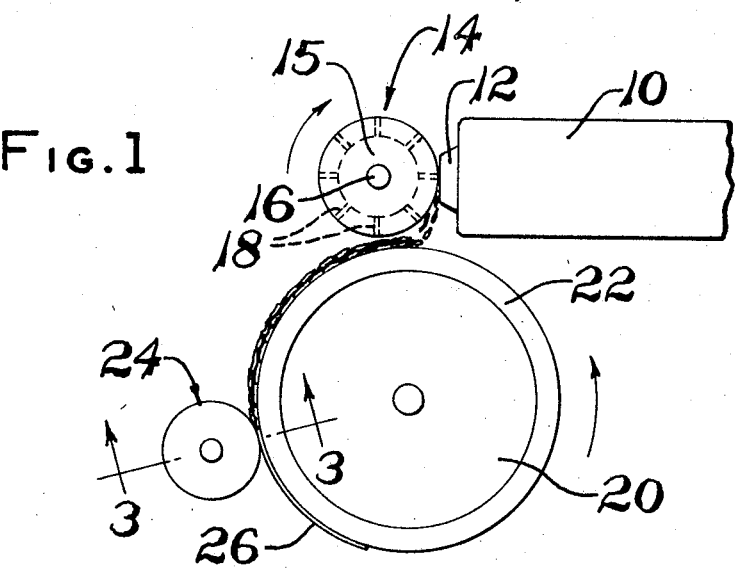
FIG. 1 is a schematic view of the tread fabricating apparatus showing the application of the cut particles to a green tire carcass.
Figure 2:
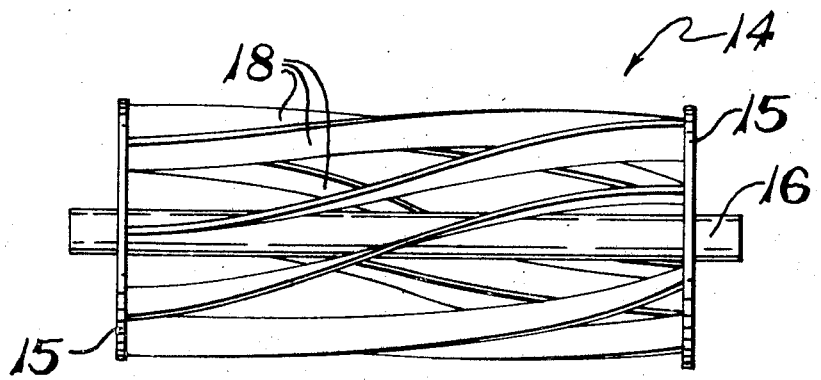
FIG. 2 is a front elevational view of the cutting means for the apparatus.
Figure 3:
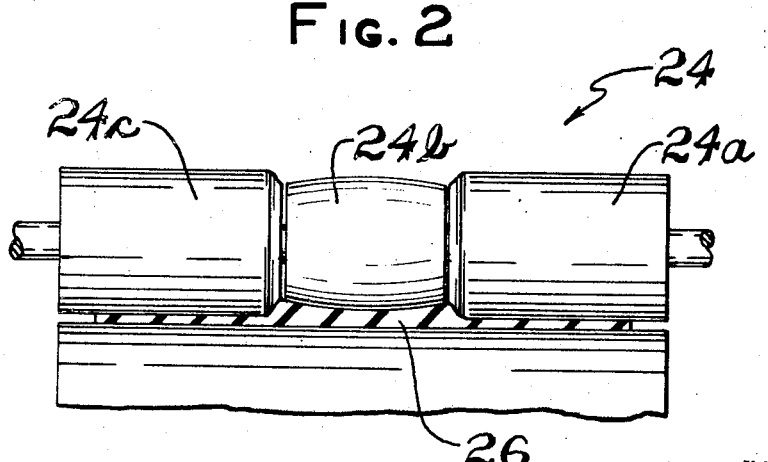
FIG. 3 is a front elevational view of the stitching apparatus shown in FIG. 1.

Referring now to the drawings wherein like reference characters designate like or corresponding parts throughout the several views, there is shown in FIG. 1 an extruder 10 which receives raw material from a suitable source, not shown, and extrudes a strip of material, such as rubber, through a die 12. The die 12 cooperates with a rotary cutter 14 located adjacent thereto to shear the strip of rubber into small fibrous strands. The cutter head 14 includes a pair of spaced flanges 15 mounted for rotation on a shaft 16 which is rotated by suitable means, not shown. A plurality of circumferentially spaced cutter blades 18 are mounted between the respective flanges 15. The cutter blades 18 have a spiral helix to form a reel type of cutter which facilitates the cutting of the rubber as it comes out of the extruder 10 such that the particles are cut into small strands. Mounted below the cutter head 14 is a tire support drum 20 on which is mounted a green tire carcass 22 to which the tread stock will be applied. Suitable means are provided to rotate the tire support 20 at a preselected speed to coordinate the rotation of cutter head 14 relative to the speed of extrusion of the strip material from the extruder 10. The small particles or strands of rubber fall on the upper portion of the tire carcass 22 of tire building support 20 and as such support rotates in counterclockwise direction as viewed in FIG. 1, the particles of rubber come in contact with a contoured stitcher 24 which compresses the fibrous particles into the shape as shown in FIG. 3 designated 26. The stitcher 24 is composed of three sets of rollers 24*a*, 24*b* and 24*c* to facilitate their rotation and compressing action. Roller 24*b* would rotate at a different speed than rollers 24*a* and 24*c*. The amount of particles built up onto the tire support 20 is determined by the speed of rotation of the drum 20 as well as the rate at which the extruder 10 is operating in cooperation with the cutter 14. The method and the operation of the apparatus is obvious in view of the above description. It should be understood, of course, that the foregoing disclosure relates to only a preferred embodiment of the invention and that numerous modifications or alterations may be made therein without departing from the spirit and scope of the invention as set forth in the appended claims.

I claim:

1. An apparatus for fabricating a tire tread onto a green tire carcass comprising means for feeding a stock of rubber material along a longitudinal pass line, said feeding means includes a die member, rotary cutter means having blade means cooperative with the face of said die member for chopping such rubber material into fibrous particles, a tire support mounted below said cutter means for collecting such sheared particles onto the surface of a green tire carcass located on said tire support, drive means operatively connected to said tire support for rotating said tire support, and a roller mounted closely adjacent said tire support for pressing said chopped fibrous particles onto the green tire carcass of said tire support.

2. An apparatus for fabricating a tire carcass as set forth in claim 1 wherein said cutter means comprises a reel type of cutter with blades having a helical path thereon.

3. An apparatus for fabricating a tire tread onto a green tire carcass as set forth in claim 1 wherein said cutter means comprises a rotating support having a plurality of circumferentially spaced cutter blades cooperative with said die for chopping rubber.

References Cited

UNITED STATES PATENTS

| | | | |
|---|---|---|---|
| 864,552 | 8/1907 | Perkins et al. | 83—355 |
| 1,669,620 | 5/1928 | Maas | 156—405 |
| 1,920,720 | 8/1933 | Thurman et al. | 156—96 |
| 2,009,599 | 7/1935 | Woock | 156—96 |
| 2,286,405 | 6/1942 | Gordon | 264—142 |
| 2,411,659 | 11/1946 | Manning | 156—128 X |
| 3,223,573 | 12/1965 | Deist | 156—405 X |
| 3,233,025 | 2/1966 | Frye et al. | 264—142 |

FOREIGN PATENTS 868,991  10/1941  France.

JOHN T. GOOLKASIAN, Primary Examiner

C. B. COSBY, Assistant Examiner

U.S. Cl. X.R.

83—355, 672; 156—244, 256; 264—142